United States Patent
Lam et al.

(10) Patent No.: US 6,694,405 B2
(45) Date of Patent: *Feb. 17, 2004

(54) METHOD FOR ANALYZING DISK SEEK TIMES IN A DISK ARRAY STORAGE DEVICE

(75) Inventors: Tao Kai Lam, Boston, MA (US); Eitan Bachmat, Lehavim (IL); Ruben Michel, Hopkinton, MA (US); Victoria Dubrovsky, Westboro, MA (US)

(73) Assignee: EMC Corporation, Hopkinton, MA (US)

( * ) Notice: Subject to any disclaimer, the term of this patent is extended or adjusted under 35 U.S.C. 154(b) by 19 days.

This patent is subject to a terminal disclaimer.

(21) Appl. No.: 10/166,433

(22) Filed: Jun. 10, 2002

(65) Prior Publication Data

US 2003/0028720 A1 Feb. 6, 2003

Related U.S. Application Data

(63) Continuation of application No. 09/396,217, filed on Sep. 15, 1999, now Pat. No. 6,405,282, and a continuation-in-part of application No. 09/143,683, filed on Aug. 28, 1998, now Pat. No. 6,189,071, which is a continuation-in-part of application No. 09/002,428, filed on Jan. 2, 1998, now Pat. No. 6,088,766, which is a continuation-in-part of application No. 08/944,606, filed on Oct. 6, 1997, now Pat. No. 6,061,761.

(51) Int. Cl.[7] .............................................. G06F 12/00

(52) U.S. Cl. ........................ 711/112; 711/100; 711/111; 711/105; 709/105; 709/226; 709/304

(58) Field of Search ................................ 711/112, 105, 711/111, 100; 709/304, 105, 226

(56) References Cited

U.S. PATENT DOCUMENTS

| | | | | |
|---|---|---|---|---|
| 3,702,006 A | | 10/1972 | Page | 709/105 |
| 4,539,637 A | * | 9/1985 | DeBruler | 709/312 |
| 4,633,387 A | | 12/1986 | Hartung et al. | 709/105 |
| 4,920,487 A | * | 4/1990 | Baffes | 709/105 |
| 5,031,089 A | * | 7/1991 | Liu et al. | 709/226 |
| 5,053,950 A | * | 10/1991 | Naganuma et al. | 709/105 |
| 5,239,649 A | | 8/1993 | McBride et al. | 709/105 |
| 6,405,282 B1 | * | 6/2002 | Lam et al. | 711/112 |

* cited by examiner

Primary Examiner—Donald Sparks
Assistant Examiner—Brian R. Peugh
(74) Attorney, Agent, or Firm—George A. Herbster

(57) ABSTRACT

Load balancing of activities on physical disk storage devices is accomplished by monitoring reading and writing operations to blocks of contiguous storage locations on the physical disk storage devices. Statistics accumulated over an interval are then used to obtain access activity values for each block and each physical disk drive. A method is disclosed for efficiently generating disk access time based upon these statistics.

13 Claims, 7 Drawing Sheets

METHOD FOR ANALYZING DISK SEEK TIMES IN A DISK ARRAY STORAGE DEVICE

CROSS REFERENCES TO RELATED APPLICATIONS

This application is a continuation of co-pending U.S. Pat. No. 6,405,282 granted Jun. 11, 2002 filed as application Ser. No. 09/396,217 on Sep. 15, 1999 for Method for Analyzing Disk Seek Times in a Disk Array Storage Device.

This is a continuation-in-part of U.S. Pat. No. 6,189,071 granted Feb. 13, 2001 (Ser. No. 09/143,683 filed Aug. 28, 1998) that is a continuation-in-part of copending application for U.S. Pat. No. 6,088,766 granted Jul. 11, 2000 (Ser. No. 09/002,428 filed Jan. 2, 1998) that is a continuation-in-part of copending application for U.S. Pat. No. 6,061,761 granted May 9, 2000 (Ser. No. 08/944,606 filed Oct. 6, 1997) and that are all assigned to the same assignee as this invention.

United States Letters patent application Ser. No. 09/396,146 filed on even date herewith for a Mailbox for Controlling Storage Subsystem Reconfigurations and United States Letters patent application Ser. No. 09/382,752 filed Aug. 25, 1999 for a Dynamic Mirror Service Policy with Seek Adjustment in a Non-Physical Mirrored Storage Environment, both assigned to the assignee of this invention are incorporated herewith by reference.

United States Letters patent application Ser. No. 09/396,218 filed Sep. 15, 1999 for a Method For Transparent Exchange of Logical Volumes in a Disk Array Storage Device filed on even data herewith and assigned to the assignee of this invention.

U.S. Letters patent application Ser. No. filed on even data herewith for a Mailbox for Controlling Storage Subsystem Reconfigurations and U.S. Letters patent application Ser. No. filed on even date herewith for a Dynamic Mirror Service Policy with Seek Adjustment in a Non-Physical Mirrored Storage Environment, both assigned to the assignee of this invention are incorporated herewith by reference.

U.S. Letters patent application Ser. No. for a Method For Transparent Exchange of Logical Volumes in a Disk Array Storage Device filed on even data herewith and assigned to the assignee of this invention.

BACKGROUND OF THE INVENTION

1. Field of the Invention

This invention generally relates to the management of resources in a data processing system and more particularly to the management of a disk array storage device.

2. Description of Related Art

Many data processing systems now incorporate disk array storage devices. Each of these devices comprises a plurality of physical disks arranged into logical volumes. Data on these devices is accessible through various control input/output programs in response to commands, particularly reading and writing commands from one or more host processors. A Symmetrix 5500 series integrated cached disk array that is commercially available from the assignee of this invention is one example of such a disk array storage device. This particular array comprises multiple physical disk storage devices or drives with the capability of storing large amounts of data up to several terabytes or more. The management of such resources becomes very important because the ineffective utilization of the capabilities of such an array can affect overall data processing system performance significantly.

Generally a system administrator will, upon initialization of a direct access storage device, determine certain characteristics of the data sets to be stored. These characteristics include the data set size, and volume names and, in some systems, the correspondence between a logical volume and a particular host processor in a multiple host processor system. Then the system administrator uses this information to configure the disk array storage device by distributing various data sets across different physical devices accordingly with an expectation of avoiding concurrent use of a physical device by multiple applications. Often times allocations based upon this limited information are or become inappropriate. When this occurs, the original configuration can degrade overall data processing system performance dramatically.

One approach to overcoming this problem has been to propose an analysis of the operation of the disk array storage device prior to loading a particular data set and then determining an appropriate location for that data set. For example, U.S. Pat. No. 4,633,387 to Hartung et al. discloses load balancing in a multi-unit data processing system in which a host operates with multiple disk storage units through plural storage directors. In accordance with this approach a least busy storage director requests work to be done from a busier storage director. The busier storage director, as a work sending unit, supplies work to the work requesting, or least busy, storage director.

U.S. Pat. No. 5,239,649 to McBride et al. discloses a system for balancing the load on channel paths during long running applications. In accordance with the load balancing scheme, a selection of volumes is first made from those having affinity to the calling host. The load across the respective connected channel paths is also calculated. The calculation is weighted to account for different magnitudes of load resulting from different applications and to prefer the selection of volumes connected to the fewest unused channel paths. An optimal volume is selected as the next volume to be processed. The monitored load on each channel path is then updated to include the load associated with the newly selected volume, assuming that the load associated with processing the volume is distributed evenly across the respective connected channel paths. The selection of the following volume is then based on the updated load information. The method continues quickly during subsequent selection of the remaining volumes for processing.

In another approach, U.S. Pat. No. 3,702,006 to Page discloses load balancing in a data processing system capable of multi-tasking. A count is made of the number of times each I/O device is accessed by each task over a time interval between successive allocation routines. During each allocation, an analysis is made using the count and time interval to estimate the utilization of each device due to the current tasks. An estimate is also made with the anticipated utilization due to the task undergoing allocation. The estimated current and anticipated utilization are then considered and used as a basis for attempting to allocate the data sets to the least utilized I/O devices so as to achieve balanced I/O activity.

Each of the foregoing references discloses a system in which load balancing is achieved by selecting a specific location for an individual data set based upon express or inferred knowledge about the data set. An individual data set remains on a given physical disk unless manually reconfigured. None of these systems suggests the implementation of load balancing by the dynamic reallocation or configuration of existing data sets within the disk array storage system.

Another load balancing approach involves a division of reading operations among different physical disk drives that are redundant. Redundancy has become a major factor in the implementation of various storage systems that must also be considered in configuring a storage system. U.S. Pat. No. 5,819,310 granted Oct. 6, 1998 discloses such a redundant storage system with a disclosed disk array storage device that includes two device controllers and related disk drives for storing mirrored data. Each of the disk drives is divided into logical volumes. Each device controller can effect different reading processes and includes a correspondence table that establishes the reading process to be used in retrieving data from the corresponding disk drive. Each disk controller responds to a read command that identifies the logical volume by using the correspondence table to select the appropriate reading process and by transferring data from the appropriate physical storage volume containing the designated logical volume.

Consequently, when this mirroring system is implemented, reading operations involving a single logical volume do not necessarily occur from a single physical device. Rather read commands to different portions of a particular logical volume may be directed to any one of the mirrors for reading from preselected tracks in the logical volume. Allowing such operations can provide limited load balancing and can reduce seek times.

Other redundancy techniques and striping techniques can tend to spread the load over multiple physical drives by dividing a logical volume into sub-volumes that are stored on individual physical drives in blocks of contiguous storage locations. However, if the physical drives have multiple logical volumes, sub-volumes or other forms of blocks of contiguous storage locations, the net effect may not balance the load with respect to the totality of the physical disk drives. Thus, none of the foregoing references discloses or suggests a method for providing a dynamic reallocation of physical address space based upon actual usage.

SUMMARY

Therefore it is an object of this invention to enable a dynamic reallocation of data in a plurality of physical disk storage devices to reduce any imbalance of load requirements on each physical disk storage.

Another object of this invention is to determine the relative utilization of physical disk storage devices to reduce imbalances in the utilization.

Still another object of this invention is to provide a procedure for obtaining a balue representing disk seek times in a physical disk storage device in an efficient manner that minimizes loads on resources.

In accordance with one aspect of this invention, total seek time required to access a physical disk storage device that stores data in a plurality of data blocks is obtained by collecting the number of disk accesses to each data block during a sample interval. This information converts to disk seek time for the sample interval by generating a first sum of the accesses to all the data blocks, by generating a second sum that is the sum of all the first sums, by generating a third sum that is a sum of the squares of all the first sums and by combining the first, second and third sums to obtain the total interval required for all the disk accesses to all the data blocks in the physical disk storage device during the sample interval.

In accordance with another aspect of this invention, obtaining a total seek time required to access a physical disk storage device that stores data in a plurality of logical volumes includes, as initial steps, collecting the number of disk accesses to each logical volume during a sample interval and generating a weighted accesses value according to:

$$WeightedAccesses = N_{rm} + \frac{N_{wr}}{2} + \frac{N_{sr}}{4}$$

where $N_{rm}$, $N_{wr}$ and $N_{sr}$ represent the number of accesses of the read miss, write and sequential read types respectively. Then the method proceeds by producing, for the first sum, the values: $A'_i = A_1 + A_2 + \ldots + A_i$ and $A_N = A_1 + A_2 + \ldots + A_N$, by producing for the second sum the value:

$$\sum_{i=1}^{N} A_{i'},$$

and by producing for the third sum the value:

$$\sum_{i=1}^{N} A_{i'}^2$$

wherein said step of combining the first, second and third sums produces a result according to:

$$\sum_{i=1}^{N} A_i - \frac{\sum (A')_1^2}{A_N}.$$

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
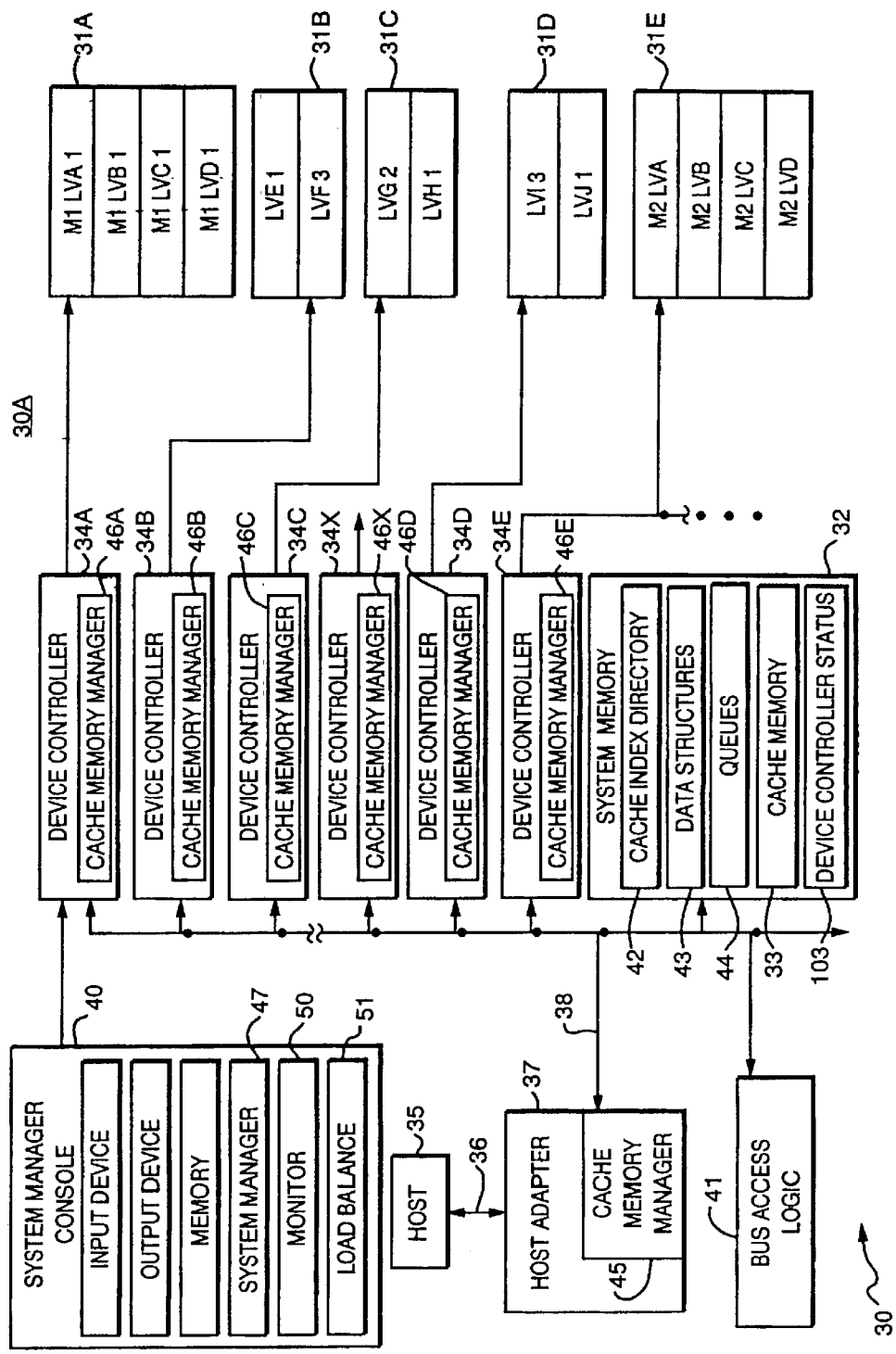
FIG. 1 is a block diagram of a specific data processing system that implements this invention.

FIG. 1 depicts, in block form, and as a typical data processing system 30, a Symmetrix 5500 series integrated cached disk array 30A that includes such a data memory system with a number of data storage devices or physical disk storage devices 31A, 31B, 31C, 31D and 31E, by way of example, and a system memory 32 with a cache memory 33. In this particular embodiment the disk array storage device 30A includes several device controllers 34A, 34B, 34C, 34D and 34E connected to corresponding ones of the physical disk storage devices 31A through 31E plus a device controller 34X representing other controllers and attached physical disk storage devices. Each device controller may have a known basic structure or a more sophisticated structure associated with mirrored operations as described in the above-identified U.S. Pat. No. 5,819,310.

The device controller 34A is shown with an associated physical disk storage device 31A divided into the mirrored logical volumes M1-LVA, M1-LVB, M1-LVC and M1-LVD; the device controller 34E controls the other physical disk storage device 31E that stores the mirrored logical volumes M2-LVA, M2-LVB, M2-LVC and M2-LVD. The logical volumes in physical disk storage devices 31A and 31E are assumed to have the same size for purposes of this explanation. However, mirrored and non-mirrored logical volumes in a physical disk storage device can have different sizes. For example, physical disk storage device 31B is depicted with two logical volumes LVE and LVF.

Assume that the LVE logical volume has the same size as the logical volumes in the physical disk 31A and that the logical volume LVF has a size that is three times the size of the logical volume LVE. Physical disk storage device 31C is shown with a logical volume LVG having twice the size of a logical volume LVH which, in turn, would have the same size as the logical volume LVA. Physical disk storage device 31D has a logical volume LVI which is three times the size of the logical volume LVJ which, in turn, has the same size as the logical volume LVA.

Moreover, there is no requirement that mirrored logical volumes in one physical disk storage device need to be mirrored on a single mirroring physical disk storage device. For example the locations of the LVJ and M2-LVA logical volumes could be interchanged. As will become apparent, in actual practice the absolute and relative sizes of logical volumes and the positions of the logical volumes will vary.

Still referring to FIG. 1 a single processor or host 35, an interconnecting data access channel 36 and a host adapter 37 connect to the system memory 32 over a system bus 38. A typical data processing system 30 may comprise multiple host adapters that connect to the system bus 38 in parallel. One or more hosts may also connect to each host adapter.

A system manager console or service processor 40 includes an additional processor that connects to the system bus 38 typically through one or more of the device controllers, such as device controller 34A by means of a serial or other communications link to the device controller 34A. The system manager console 40 permits a system operator to run set-up and diagnostic programs for configuring, controlling and monitoring the performance of the disk array storage device 30A. Essentially the system manager console 40 enables the operator to establish communications with the host adapter 37, the device controller 34B and the system memory 32. One approach for establishing communications among the various host and disk adapters and the service processor system manager are described in the above-referenced United States Letters patent application Ser. No. 09/396,146.

Before any component, such as the host adapter 37 or the device controllers 34A and 34B can access the system memory 32, that component must obtain access to the system bus 38. Conventional bus access logic 41 receives access request signals from these components and grants access to only one such component at any given time. A wide variety of known arbitration schemes are suitable for use in a data storage system employing multiple processors and a shared system memory, such as the system memory 32.

Preferably the system memory 32 in FIG. 1 is a high-speed random-access semiconductor memory that includes, as additional components, a cache index directory 42 that provides an indication including the addresses of the data which is stored in the cache memory 33. In a preferred embodiment, the cache index directory 42 is organized as a hierarchy of tables for logical devices, cylinders, and tracks. The system memory 32 also includes areas for data structures 43 and queues 44. The basic operation of the system memory 32 is described in Yanai et al., U.S. Pat. No. 5,206,939 issued Apr. 27, 1993. System memory 32, particularly the cache memory 33, may also include a region of memory known as permacache memory. As is well known, data elements remain in permacache memory unless they are specifically deleted.

The coordination of each of the host adapters with each of the device controllers is simplified by using the system memory 32, and in particular the cache memory 33, as a buffer for data transfers between each host adapter and each device controller. Such a system, for example, is described in U.S. Pat. No. 5,206,939. In such a system, it is not necessary to provide a processor dedicated to managing the cache memory 33. Instead, each of the host adapters or device controllers executes a respective cache manager program, such as one of the cache manager programs 45 in the host adapter 37 and cache manager programs 46A and 46B in each of the device controllers 34A through 34X. A system manager program 47 performs a similar function for the system manager console 40 and enables the operator to configure the system. Each of the cache manager programs accesses the cache index directory 42 and operates with data structures and queues for storing various commands. More specifically, the cache manager program 45 in the host adapter 37 writes data from the host 35 into the cache memory 32 and updates the cache index directory 42.

In addition, and in accordance with this invention, each cache memory manager gathers statistics. Specifically, the cache memory manager 45 will accumulate statistics concerning a number of parameters. For the purpose of this invention, the number of reading and writing operations requested by a host 35 or connected hosts are important. Likewise each of the cache memory managers 46A through 46X in each of the device controllers 34A through 34X gathers statistics for the logical volumes on each connected physical disk storage device. A monitor 50 in the system manager console 40 integrates these cache memory managers to obtain appropriate statistics at given intervals.

From the foregoing, disk operations included in any measure of the loading of a logical volume will include reading operations and writing operations. Reading operations can be further classified as read-hit, read-miss and sequential read operations. A read-hit operation occurs when the data to be read resides in the cache memory 33. A read-miss occurs when the data to be read is not available in the cache memory 33 and must be transferred from a physical disk storage device. Sequential read operations are those that occur from sequentially addressed storage locations.

The system operates with two types of writing operations. The first transfers the data from the host 35 to the cache memory 33. The second type transfers the data from the cache memory 33 to a physical disk storage device. The second type operates in a background mode, so it is possible that the host 35 may write data to a location more than once before the data is written to a physical disk storage device. Consequently the number of writing operations of the second type normally will not correspond to and will be less than the number of writing operations of the first type.

With this background, the determination of appropriate reallocations of logical volumes on physical disks in accordance with this invention can be described. The program relies upon information supplied from the performance monitor 50 that retrieves statistics from each cache memory manager on a periodic basis. The periodicity will be selected according to conventional sampling criteria. Typical periods will be from up to 15 to 30 or more minutes. As each set of statistics is time stamped and accumulated by logical volume, the total number of read operations, a read-hit ratio, a sequential-read ratio and the total number of writing operations over a test interval can be obtained. The load balance program 51 shown in FIG. 1 then operates according to FIGS. 2A and 2B to generate, from that collected monitored performance generally represented by step 60 in FIG. 2A, a reallocation or exchange of a pair of logical volumes.

Specifically, when it is time to perform an analysis, a wait loop represented as a decision step 61 transfers control to retrieve, by means of the performance monitor 50 in step 62, all the statistics that are relevant to the test interval.

The load balance program 51 uses step 63 to define a list of pairs of exchangeable logical volumes. There are several criteria that must be evaluated in determining this list. First, exchangeable logical volumes must have the same size. In actual practice most logical volumes will be selected from one of a relatively small number of physical sizes. Second, any interrelationship between the two logical volumes to be exchanged must be examined to determine whether there is any reason to preclude the exchange. For example, swapping logical volumes on the same physical disk storage device generally will have little or no impact. Mirroring, as described in the above-identified U.S. Pat. No. 5,819,310 or other redundancy may further restrict the available exchangeable pairs of logical volumes. For example, mirrored logical volumes normally will be precluded from residing on the same physical disk storage device or even on physical disk storage devices on the same controller or adjacent controllers. For RAID-5 redundancy, exchangeable pairs of logical volumes usually will be limited to those in the same parity group.

In the specific example of FIG. 1, based on size, the logical volumes LVA through LVE, LVH and LVJ are all potential exchange candidates. Likewise the logical volumes LVF and LVI are candidates for exchange. There is no logical volume as a candidate for exchanging with the LVG logical volume in the specific embodiment shown in FIG. 2.

Using the functional criteria, the potential logical volumes that could be swapped with the logical volume M1-LVA in the physical drive 31A include logical volumes LVE, LVH and LVJ, assuming that an exchange with a mirror would have no effect. Swapping the LVA logical volume in physical disk 31A with any of the logical volumes LVB through LVD in physical drive 31E is precluded because both mirrors of the logical volume LVA would be resident on the same physical disk drive. Other potential logical volume pairs include the pairs LVE-LVH, LVH-LVJ and LVE-LVJ. The logical volumes LVF and LVI define one exchangeable pair. Thus in this particular embodiment there are twenty-seven possible exchangeable pairs of logical volumes.

In step 64, the load balance program uses the accumulated statistics and read-hit ratio to produce a read-miss value, a sequential-read value and a write-to-disk value for each logical volume over the prior test interval. As previously indicated the read-miss value corresponds to the number of read operations that require access to a physical disk drive for data, a read-hit being a reading operation that finds the requested data in the cache memory 33 of FIG. 1. When step 64 is completed, there exists, for each logical volume, a logical volume access activity value, x, represented by the sum of the read-miss and write-to-disk operations.

The logical volume access activity value can be further refined to reflect the actual load imposed by different operations. For example, each write operation can be considered as imposing half the load of a read-miss operation. If such an assumption is carried forward, the logical volume access activity is equal to the total number of read-miss operations plus half the total number of write operations. If a series of sequential-read operations occur, the number of events in the sequence can be divided by 4 or some other number to compensate for the difference in loading imposed by sequential and random reading operations. In a mirrored configuration, a read-miss results in only one read operation being performed although there is a potential for two, one from each mirror. Consequently, in a mirrored system the number of read misses to a mirrored logical volume will be halved to compensate for mirroring.

In step 65 the load balancing program 51 constructs a table that identifies the total access activity value for each physical storage device by summing, for each physical disk storage device, the access activity values for each logical volume on that physical disk storage device. At this point a total average physical activity value can also be obtained by summing the physical volume access activity values and dividing by the number of physical devices.

Figure 2A:
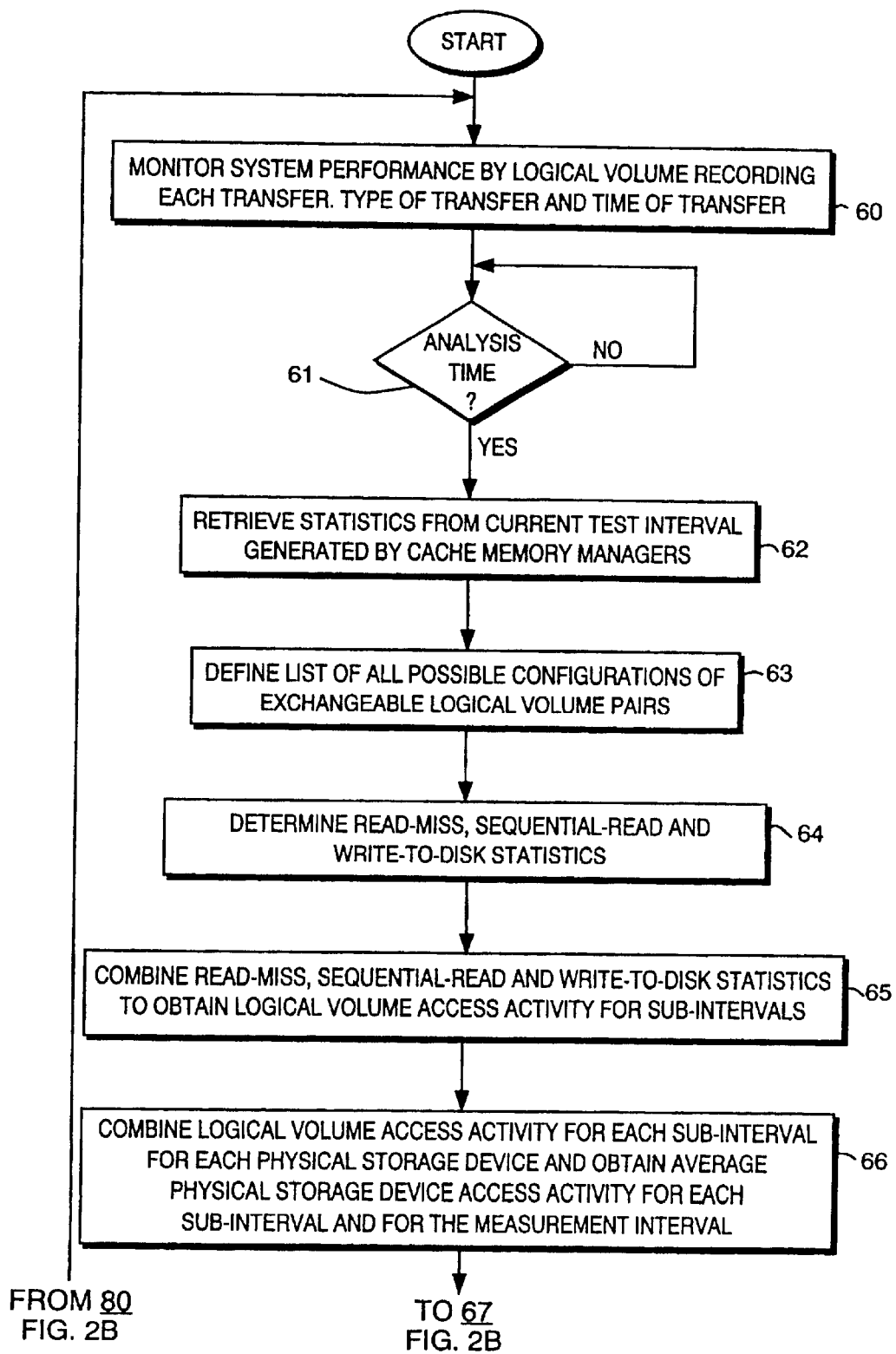
FIGS. 2A and 2B constitute a flow diagram that depicts one procedure for exchanging logical volumes in accordance with this invention.
Figure 2B:
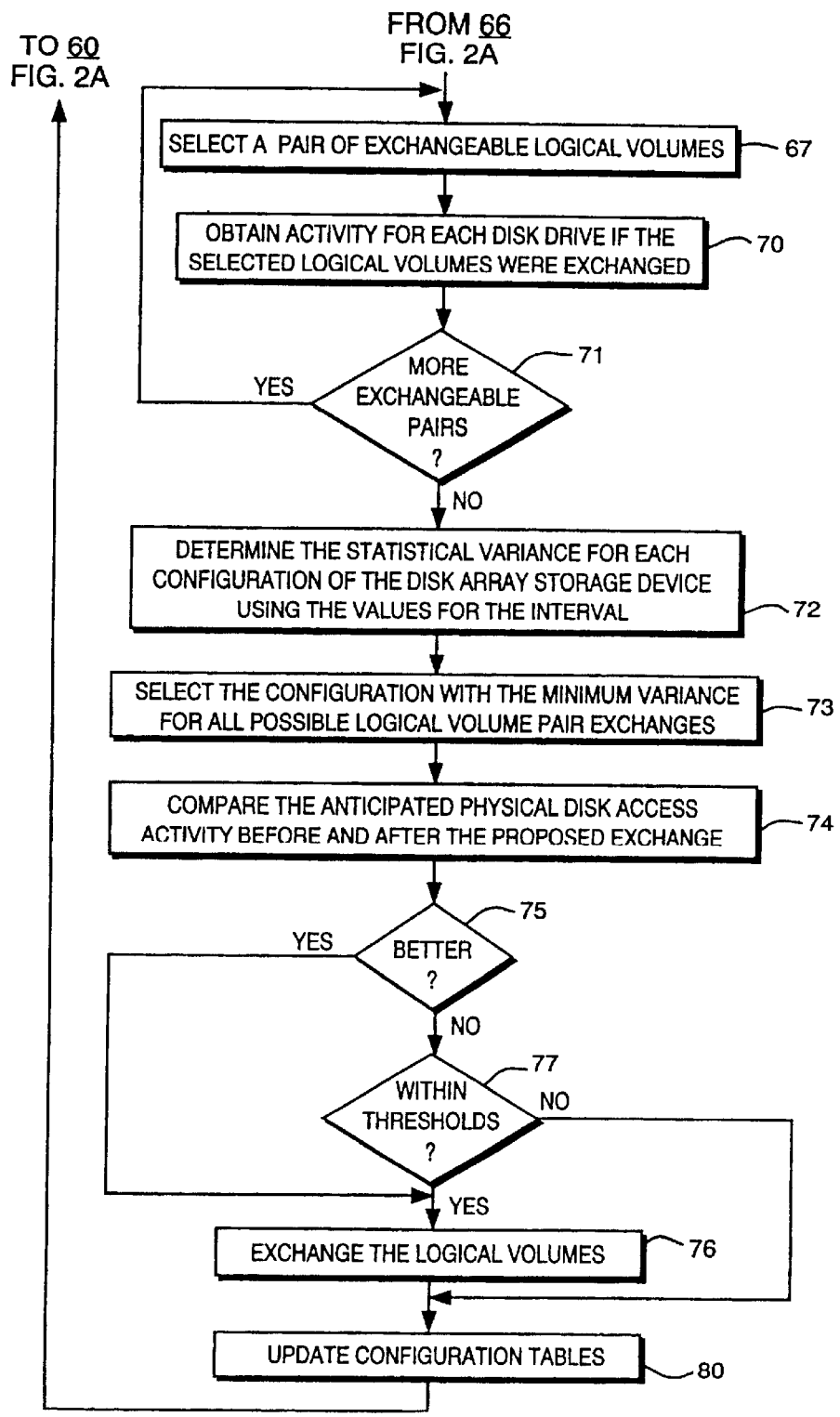

When step 66 in FIG. 2A has been completed, control passes to steps 67 and 70 that form a loop under a loop control 71 in FIG. 2B. Specifically step 67 selects a pair of logical volumes from the list developed in step 63 of FIG. 2A. Assume, for example, that the pair M1 LVA-LVE is selected. In step 70 the load balancer program 51 utilizes the accumulated statistics for obtaining the activity for each physical disk drive as if those two logical volumes had been exchanged. This loop continues until all the logical volume pairs in the list have been evaluated. Once this occurs, control branches to step 72 to define a statistical variance for each configuration according to:

$$|E(x^2)-[E(x)]^2|_{min} \tag{1}$$

That is, for each possible configuration the load balance program 51 step 72 determines the average access activity value for the physical disk storage devices with the logical volume pairs and obtains a difference from the average physical drive access activity value obtained in step 65 assuming each pair is exchanged. Thereafter step 72 produces the statistical variance for each logical volume pair exchange. In step 73 the load balancer program 51 selects a logical volume pair that produces the minimum statistical variance. Processes for obtaining the above-identified statistical variances are well known in the art.

After that selection, the identity of the logical-volume pair is used in a pretest of the selection. As previously indicated, the monitor 50 accumulates data as discrete sets on a periodic and recorded time basis. In step 74 the load balancing program breaks the total test interval into subintervals that may include one or more sampling periods. Next the activity values for each subinterval or group of subintervals are determined. If the access activity value for exchange effected physical drives is less than the original, step 75 branches to step 76 to initiate the exchange. If a subinterval exists that exceeds the average, step 77 determines whether the access activity value is within an acceptable limit. If it is, the exchange occurs in step 77 and the configuration tables in the system are updated to reflect the new configuration. Otherwise no exchange is made.

When step 76 exchanges the designated logical volumes, such an exchange, or swap, can occur by selecting an unused area in one of the physical disk drives to operate as a buffer. This may be an unused area in a physical disk storage device or in a dynamic spare physical disk storage device. The general use of physical disk storage devices as dynamic spares is known in the art. In other circumstances it may be possible to utilize a cache memory such as the cache memory 33 in FIG. 1, as a buffer. If a single buffer is to be used and logical volumes LVE and LVJ are to be exchanged, a concurrent copy or other transfer sequence can move (1) the LVE logical volume to the buffer, (2) the logical volume LVJ to the corresponding area in the physical disk storage device 31B and (3) the logical volume buffer to the area in physical disk storage device 31D. The use of a concurrent copy or other analogous procedure enables the exchange to occur on-line, albeit with some performance degradation for the duration of the transfer. After the exchange is completed, control branches back to step 60 in FIG. 2A to initiate the monitor 50 thereby to accumulate additional statistics about the new configuration.

In accordance with this specific example, assume that both the logical volumes LVE and LVF in physical disk storage device 31B have become very active and that the logical volume LVJ on physical disk storage device 31D is relatively inactive. If all other logical volumes were equally active, the statistical variance should be minimal when the logical volume pair LVE and LVJ is selected. Therefore those two volumes would be exchanged thereby decreasing the load on the physical disk storage device 31B and increasing the load on the physical disk storage device 31D, but not to the extent that had existed on the physical disk storage device 31B.

Still other methods can be used to effect the swap.

Figure 3:
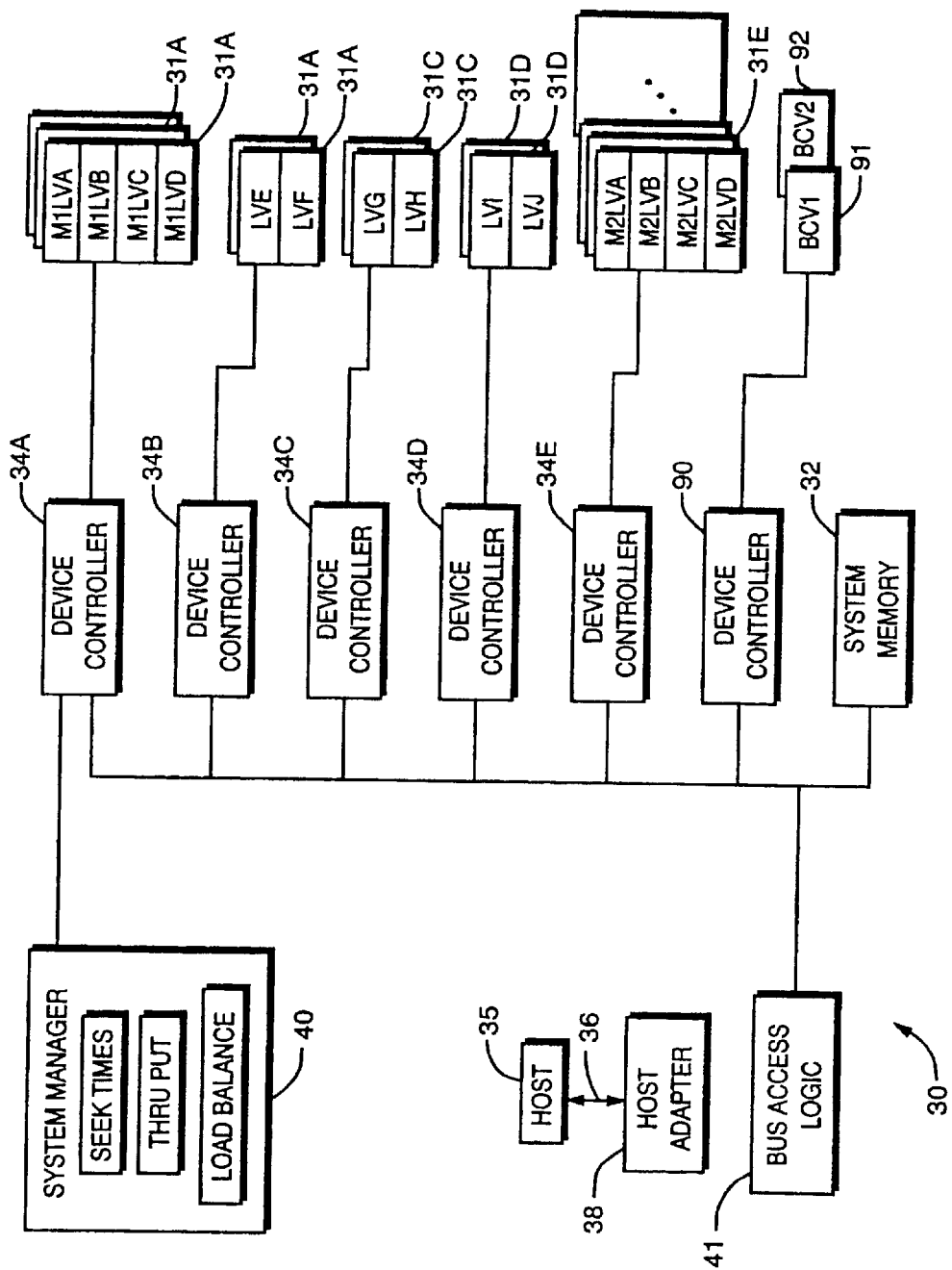
FIG. 3 is a block diagram of another specific data processing system that provides another type of data exchange.

FIG. 3 depicts a modification of the circuit in FIG. 1. in which like reference numerals apply to like items in FIGS. 1 and 3. The modification of FIG. 3 primarily consists of the addition of a device controller 90 with two storage or logical volumes 91 and 92. Although a single device controller 90 and two storage devices 91 and 92 are depicted, storage devices 91 and 92 may connect through different device controllers. A device controller may also control a storage device, such as the storage device 92 and one or more other storage devices. Each of the storage devices 91 and 92 in FIG. 3 is defined as a DRV device described in the foregoing U.S. Letters patent application Ser. No. (Atty. No. E30-037). Still other approaches could be applied to the swapping or exchange operation.

Figure 4A:
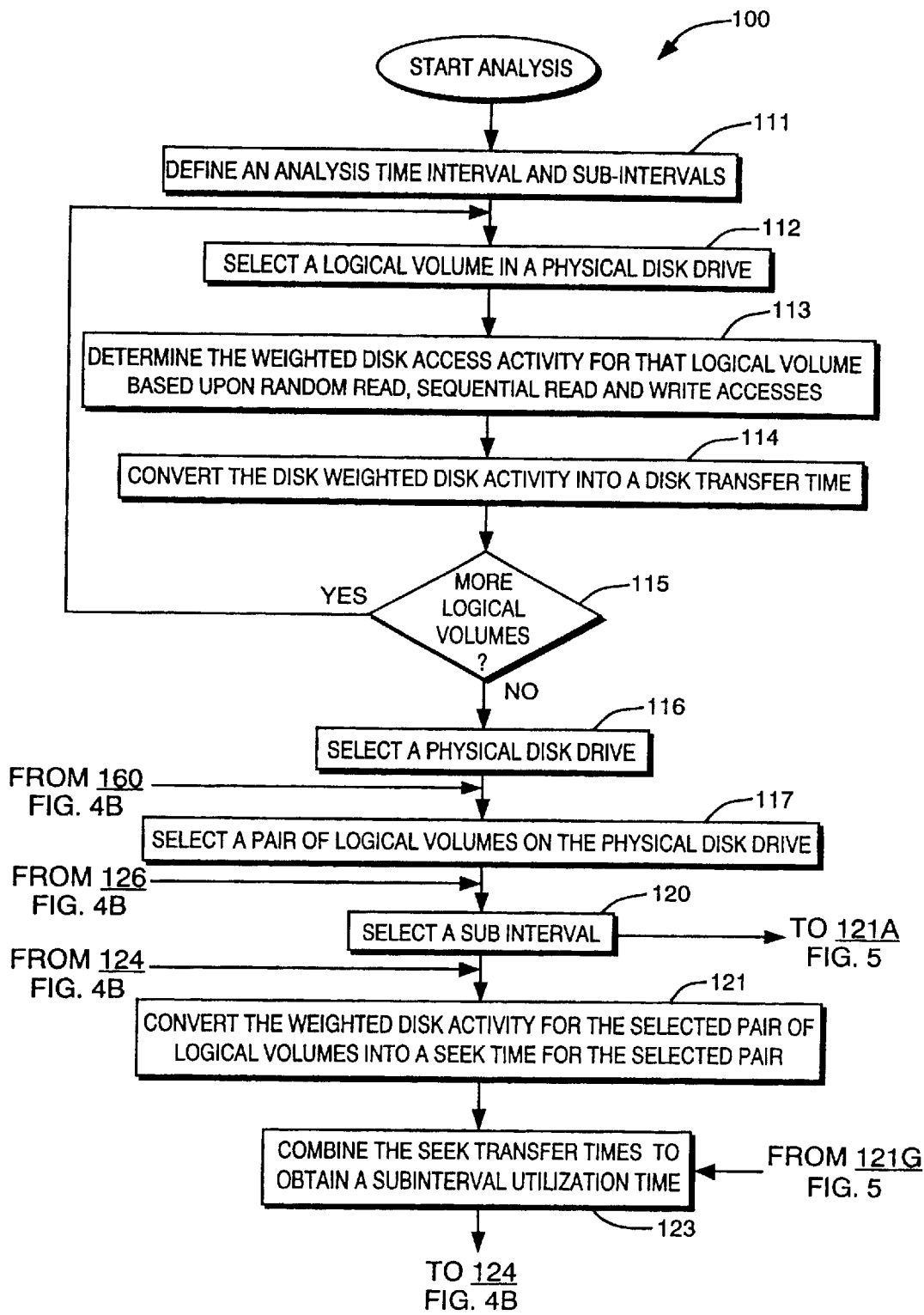
FIGS. 4A and 4B constitute a flow diagram that depicts the implementation of the other procedure for exchanging Logical volumes in accordance with this invention.
Figure 4B:
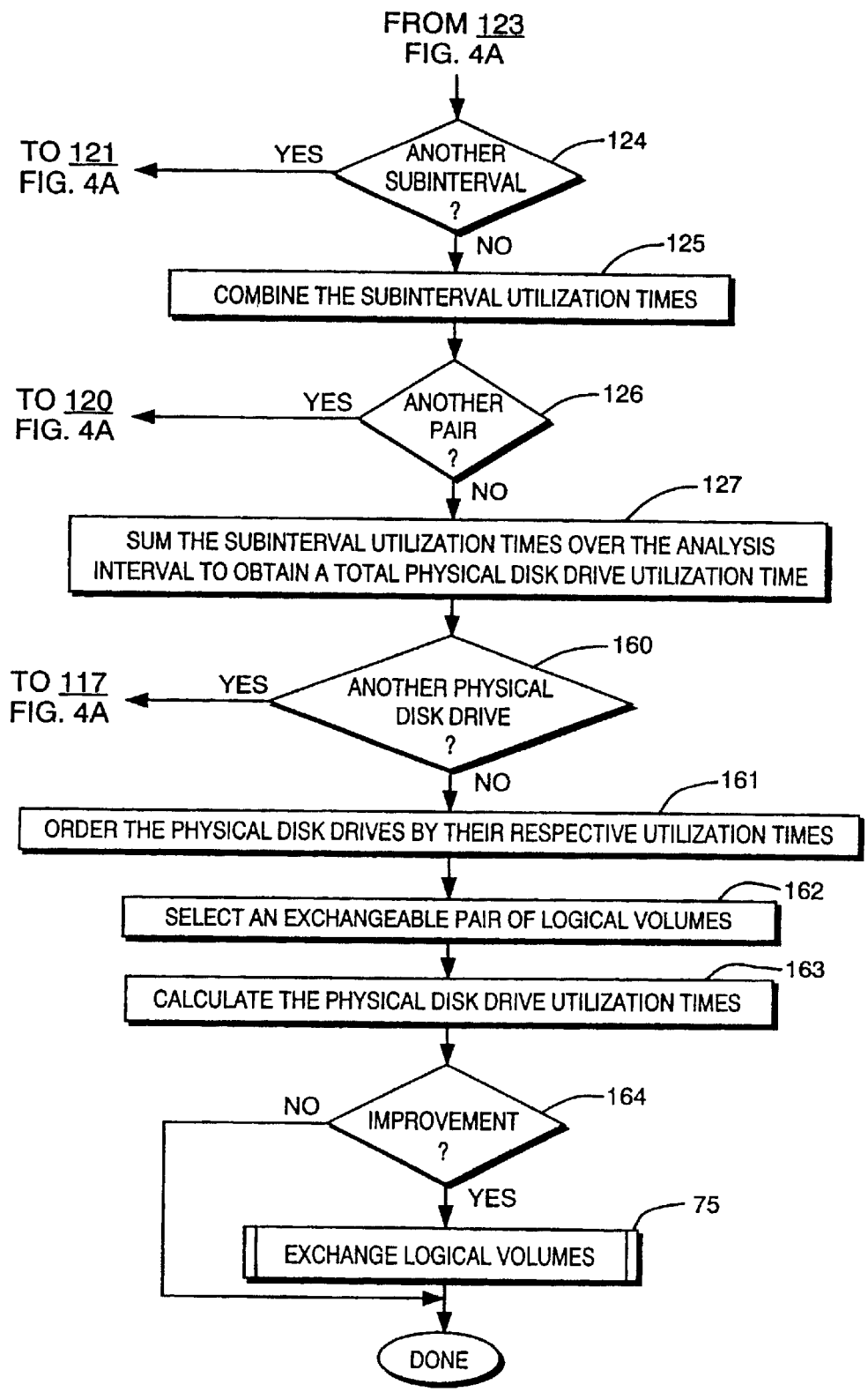

Thus, the procedure outlined in FIGS. 4A and 4B provides a means for exchanging data blocks in a very efficient manner by using DRV logical volumes as available buffer memories. Moreover, the exchange can be made with little or no impact on the operations of the data processing system.

Figure 5:
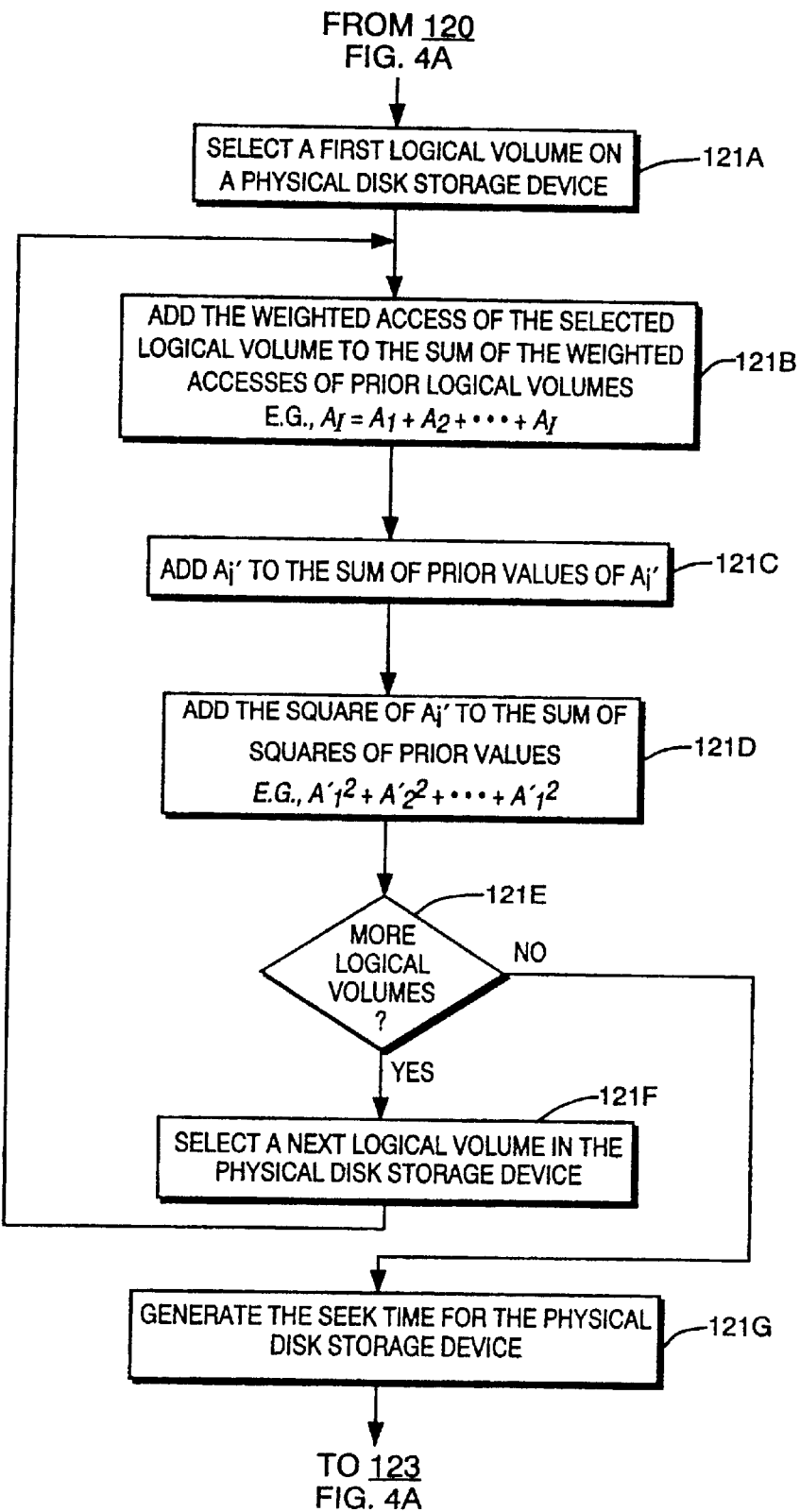
FIG. 5 constitutes a flow diagram that depicts a procedure for obtaining a disk operating characteristic in accordance with this invention.

Steps 62 through 77 in FIGS. 2A and 2B depict a procedure for performing analysis based upon disk utilization for each exchangeable logical volume as determined by the total number of accesses to a physical disk drive and logical volumes that are the targets of I/O requests. FIG. 5 depicts a procedure for analyzing load balance using time-based disk utilization statistics as a criterion. This procedure has achieved improved results in many applications.

The analysis time interval for this procedure can be measured in terms of a few hours to days or weeks or longer. Subintervals can also be of arbitrary length ranging from a few minutes to an hour or more. As will become apparent, the duration of a subinterval is a tradeoff between the accuracy of sampling which is desired and the number of calculations that must be performed on the samples. The duration of the analysis time interval depends, in part, upon a time that provides some reasonable level of consistent performance. These can be generally selected with experience. An initial selection of an analysis time interval of one week and subintervals in the order of fifteen minutes has been found to be satisfactory in many applications. Step 111 represents the definition of an analysis time interval and sub-intervals.

Step 112 represents a conventional procedure by which the system selects a logical volume as a data block for analysis. The system then uses step 113 to count the number of disk accesses and segregate them into independent disk read, disk write and sequential pre-fetch read categories. These counting operations are upheld in each logical volume for each of the subintervals in the analysis time interval. It has been found that weighting this information can improve the overall result, particularly a weighting of 1.0 for independent disk reads, 0.5 for disk writes and 0.25 for sequential pre-fetch reads. In accordance with this approach, the number of Weighted Accesses is given by:

$$WeightedAccesses = N_{rm} + \frac{N_{wr}}{2} + \frac{N_{sr}}{4} \qquad (2)$$

where $N_{rm}$ and $N_{wr}$ represent read-miss accesses and write accesses. $N_{sr}$ represents the number of sequential read access operations that occur during the subinterval. If the access activity in a subinterval includes 10 read miss accesses, 20 write accesses and 8 sequential read accesses, $N_{rm}=10$ $N_{wr}=20$, $N_{sr}=8$, and there will be a total of 38 accesses. However, according to Equation (2), the number of weighted accesses will be 22.

Once this information has been generated for a particular logical volume or other data block by any of the foregoing methods, step 115 determines whether additional logical volumes exist that remain untested. If more logical volumes exist, control passes back to repeat steps 112 through 114.

After all the logical volumes have been processed to obtain the disk transfer times for each logical volume and each subinterval, step 115 diverts control to step 116. Step 116 begins an analysis that provides the utilization times, specifically disk seek times, for the logical volumes. Specifically steps 116, 117 and 120 select, in order, a physical drive, a pair of logical volumes on that drive and a subinterval. For each subinterval step 121 converts the number of accesses to the selected pair of logical volumes is converted into a seek time T(seek)d for a given drive, d, segregated into N logical volumes according to:

$$T(\text{seek})_d = \left[ \frac{\sum_{\substack{i \neq j}} T_{i,j} * A_i * A_j}{\sum_{k=1}^{N} A_k} \right] \qquad (3)$$

wherein $T_{ij}$ represents the seek time and $A_i$ and $A_j$ represent the respective weighted activities for each of two selected logical volumes for a given pair (i,j) of logical volumes on the disk drive d, wherein $1 \leq i \leq N$, $1 \leq j \leq N$, and $i<>j$, and wherein the sum of $A_k$ for all values of k, i.e., $1 \leq k \leq N$ represents the total number of weighted accesses to the physical disk storage device, d. Equation (3) thus provides a statistical representation of the number of seeks and seek time between the logical volumes i and j based upon the activity to each logical volume in that drive over the subinterval. The sum for all logical volume pairs on the physical disk drive represents the total amount of seek time conducted by the physical disk drive for the selected subinterval.

There are several ways to determine the seek time $T_{ij}$. In one approach a seek time table records the seek time between each pair of tracks for each type of drive. This seek time can be based upon manufacturer supplied data, sample measurements, in situ measurements or other procedures. Data based upon sample measurements has provided good results.

The monitor 50 in FIG. 1 will additionally contain in its configuration table a center-line track position of each logical volume on a physical disk drive. This information will provide, for any seek operation, the starting and ending tracks based upon the centerline track position. It has been found that the use of a centerline track position also provides good results. The starting and ending centerline tracks can then be used as an entry into the seek time table information for the corresponding disk drive to obtain the $T_{ij}$ time for that specific disk drive. Thus, for a given pair of logical volumes, the seek time T(seek)d derived from Equation (3) provides a good statistical approximation the total seek time involved for the specified pair of logical volumes during the subinterval.

In many applications the time and other resources required for the system manager to calculate the disk seek times for various volumes can be individually long or burdensome. An alternate approach has been found that also provides an acceptable seek time value but with a significantly reduced burden on the resources of the system manager 40. As described in the above-identified U.S. Letters patent application Ser. No. (Atty. No. 07072/925001), another seek-time function, New $T(seek)_d$, is given by:

$$NewT(seek)_d = \frac{\sum_{i=1}^{N}\sum_{j=1}^{N} A_i * A_j |i-j|}{\sum_{k=1}^{N} A_k} \quad (4)$$

An analysis of Equations (3) and (4) shows that Equation (4) provides an acceptable disk seek value. As will now be shown, equation (4) can be manipulated to provide a very simple solution that greatly reduces the burden on the resources for determining seek times. In some applications, this procedure has provided an 8:1 reduction in the time required to obtain the seek times. As will be apparent, such a reduction in the burden is highly desirable.

Specifically, if the sum of activities, $A'_i$, for each logical volume is computed as:

$$A'_i = A_1 + A_2 + \ldots + A_i \quad (5)$$

Substituting Equation (5) in Equation (4) and manipulating the terms yields another value for disk seek time, New T(seek), that is given by:

$$NewT(seek) = \sum_{i=1}^{N} A'_i - \frac{\sum_{i=1}^{N} A_i'^2}{A'_N} \quad (6)$$

where $A'_i$ is the sum of the activities for all the logical volumes; that is:

$$A'_N = A_1 + A_2 + \ldots A_N \quad (7)$$

FIG. 5 depicts a method for determining disk seek times using equations (6) and (7) that can replace the procedure or step 121 in FIG. 5B. Consequently, FIG. 5 uses reference numeral 121 with a letter suffices to designate the specific steps.

When control passes from step 120 in FIG. 4B to the procedure in FIG. 5, step 121A selects a first logical volume on a physical disk storage device to be analyzed.

Step 121B then adds the weighted access of the selected logical volume to the sum of the weighted accesses of prior logical volumes. During the analysis of the first logical volume, the sum of the weighted accesses of prior logical volumes, as apparent, will be 0. For successive logical volumes step 121B produces a value for the variable $A'_{i=A1} + \ldots + A_i$.

Step 121C then sums the weighted access with the sum of the prior values of the summed weighted access. After processing the first logical volume, step 121C produces a value of $(A'_1 + A'_2 + \ldots + A'_i)$.

Step 121D then adds the square of $A'_i$ to the sum of the squares of previous values of $A'_i$. That is, step 121D provides a value of $[(A'_1)^2 + (A'_2)^2 + \ldots + (A'_i)^2]$.

If there are more logical volumes step 121E transfers control to step 121F whereupon a next logical volume is selected. In a specific implementation with systems supplied by the assignee of this invention, the selection process is orderly. Specifically, each physical disk storage device stores its logical volumes at assigned positions. The first selected logical volume in step 121A should be the first logical volume on the physical disk storage device. Step 121F should select the second through Nth logical volumes in the same order.

After step 121F makes a selection, control passes back to step 121B. This loop continues until all the logical volumes have been processed. Then step 121E transfers control to step 121G to generate the seek time for the physical disk storage device according to Equation (6) to compute the New $T(seek)_d$. More specifically, the value $A_N$ obtained in step 121B becomes the denominator in the right-hand term Equation (6); the value obtained in step 121D, the numerator of that right-hand term. Step 121B provides the value for the left-hand term. Stated differently, Equation (6) becomes:

$$NewT(seek) = \text{Value from } 121D - \frac{\text{Value from } 121B}{\text{Value from } 121C} \quad (8)$$

As will now be apparent, the direct solution of either equation (3) or (4) requires a procedure that uses an outer calculation loop for various values of i and an inner calculation loop for various values of j; i.e., a two-loop solution. The time required to perform such calculations will then increase approximately as the square of the number of logical volumes in a physical disk storage device. Equation (6) when implemented according to FIG. 5 provides the result of Equation (8) with only one loop. Consequently the time required to obtain the representation of disk seek activity will increase approximately as the number of logical volumes and, therefore, will be reduced significantly over the time required to obtain the value with a two-loop solution. A comparison involving a physical disk drive with eighteen logical volumes demonstrated that the single-loop solution provided a result in ⅛ of the time required to produce the result with the two-loop solution.

Step 123 then combines the seek time, however obtained, and the disk transfer times to obtain a subinterval utilization time that represents the total time that a physical disk operates in performing transfers including all of the seek, latency and data transfer times associated with that activity.

Step 124 in FIG. 4B determines whether all the subintervals have been processed. If more subintervals exist for the selected pair of logical volumes, step 124 branches back to step 121 to repeat the process of steps 121 through 123. When the subinterval utilization times have been obtained for all the subintervals, step 125 combines or sums the times to obtain a subinterval utilization time for that selected pair of logical volumes. Step 126 then determines whether additional pairs of logical volumes exist on the physical disk drive selected in step 116. If another pair of logical volumes exists, control passes back to step 117 to obtain the combined subinterval utilization times for that pair.

After all the utilization times for different logical volume pairs on the physical disk drive have been obtained and summed step 126 transfers control to step 127, thereby to sum the interval utilization times over the entire interval to obtain total physical disk drive time-based utilization statistics for that particular physical disk drive. Step 160 then determines whether additional physical drives need to be tested and branches back to step 116 to select another physical drive if needed.

After all the physical drives have been analyzed, control passes from step 160 to step 161 in which the physical disk drives are ordered by their respective time-based utilization statistics. In step 162 an exchangeable pair of logical volumes is selected. This selection process can be achieved in many ways. A simple approach is merely to define an exchangeable pair in which one of the pair is the busiest logical volume in the physical disk drive with the highest time-based utilization statistics and the second is the least busy logical volume on the physical disk drive having the lowest time-based utilization statistics. The philosophy is that if the busiest logical volume on the busiest physical drive is exchanged for the least busy volume on the least busy drive improved load balancing will be achieved.

Step 163 represents the procedure by which the previous process of steps 112 through 131 are repeated using the information from the proposed exchange disk drives. That is, in the particular example described above, the analysis would be revised by examining physical disk drives 31A and 31B to recalculate their various parameters assuming the LVE logical volume is exchanged with the M1-LVA logical volume. If an improvement seems likely, step 164 branches to step 75 representing either of the foregoing processes for exchanging logical volumes. If not, the analysis ends without making any exchange.

The foregoing analysis is described with a single selected exchangeable pair being analyzed. It will be also apparent that it may be advantageous to examine the changes in relative physical disk loading balance looking at the various combinations that could exist among all the exchangeable logical volumes pair taken one pair at a time. Typically, however, this will require such significant processing time as to become impractical. As still another alternative, a preset number of exchangeable pairs could be evaluated in order to limit the amount of time required to make a determination of whether an exchange would be beneficial.

In summary, this foregoing disclosure defines various methods for balancing the load in a magnetic disk storage system comprising a plurality of physical disk drives. Typically each disk drive is divided into multiple logical volumes. Statistics of the occurrence of read, write, and sequential pre-fetch read operations and of the total amount of transferred data are maintained over at least an analysis interval as a function of time. The analysis interval comprises a series of sampling subintervals and uses a statistical analysis to process the data for each subinterval, for each pair of logical volumes within a single physical disk drive and for all total activity in terms of a physical disk drive utilization time representing the total time subinterval that the physical disk drive is involved in various read and write operations during the analysis interval. Several specific processes have been disclosed for obtaining this disk utilization time number for each logical volume in each physical disk storage device. Thereafter the disk utilization time information can be used in the selection of two candidates for a logical volume exchange. When a pair has been selected, one of two procedures as described above, enable the exchange to occur with minimal interruption to normal data processing operations.

The foregoing description discusses this invention in terms of data organized into blocks of contiguous storage locations on a physical disk storage device of known size called logical volumes. However, the invention is applicable to other data organizations. In some applications, for example, a logical volume might be divided into a series of sub-volumes distributed across plural physical disk storage devices. Such a division could be made for redundancy and recovery purposes or for load distribution purposes. Each block, whether a logical volume, sub-volume or other grouping, constitutes a block of contiguous storage locations of a predetermined size. Conversely and consequently, a block then can be a single logical volume, sub-volume or other grouping.

The invention as previously described, is equally applicable to such systems. That is, the method operates with any blocks of contiguous storage locations, be they organized as logical volumes, sub-volumes or other groupings. In essence and in accordance with any of the foregoing embodiments of this invention, various read and write statistics are accumulated for each block over a time interval. A list of all pairs of exchangeable blocks are established using the previously described size and other criteria that correspond to the criteria discussed in connection with step 63 in FIG. 2A. If a logical volume is divided into sub-volumes for redundancy, an additional criteria could prevent sub-volumes from the same logical volume from residing on one physical disk storage device. The configuration to be established is then evaluated in the same manner as the configuration is evaluated for an array divided into logical volumes, except for the evaluation being based on individual blocks. Assuming the configuration will provide better performance, the exchange is made in a manner that is analogous to the exchange in step 76 of FIG. 2B in accordance with the exchange procedure stated in step 75 of FIG. 4B.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A system for determining a total seek time required to access a physical disk storage device that stores data in a plurality of data blocks, said system comprising:
   A) collection means for collecting the number of disk accesses to each data block during a sample interval,
   B) first summing means for generating a first sum of the accesses to all the data blocks,
   C) second summing means for generating a second sum that is the sum of all the first sums,
   D) third summing means for generating a third sum that is a sum of the squares of all the first sums, and E) combining means combining the response to said first, second and third summing means for first, second and third sums to obtain the total interval required for all the disk accesses to all the data blocks in the physical disk storage device.

2. A system as recited in claim 1 wherein the physical disk storage device contains N data blocks and $A_i$ represents the accesses to a given data block, i, said first summing means includes means for producing the value:

$$A_i = A_1 + A_2 + \ldots + A_i \tag{1}$$

and means for producing the value:

$$A'_N = A_1 + A_2 + \ldots + A_N. \tag{2}$$

3. A system as recited in claim 2 wherein said second summing means includes means for generating the value:

$$\sum_{i=1}^{N} A_{i'}. \tag{3}$$

4. A system as recited in claim 3 wherein the said third summing means includes means for generating the value:

$$\sum_{i=1}^{N} A_i'^2. \tag{4}$$

5. A system as recited in claim 4 wherein said combining means includes means for producing the value:

$$\sum_{i=1}^{N} A_i' - \frac{\sum_{i=1}^{N} A_i'^2}{A'_N}. \tag{5}$$

6. A system as recited in claim 5 wherein accesses to each data block are grouped into different types, said first summing means comprising means for weighting the numbers of accesses by type whereby the weighted accesses are used for generating the first sum.

7. A system as recited in claim 5 wherein accesses to each data block are grouped into read miss, disk write and sequential read types, said first summing means comprising means for weighting the numbers of accesses according to:

$$WeightedAccesses = N_{rm} + \frac{N_{wr}}{2} + \frac{N_{sr}}{4} \tag{6}$$

where $N_{rm}$, $N_{wr}$ and $N_{sr}$ represent the number of accesses of the read miss, write and sequential read types respectively, whereby the Weighted Accesses are used for generating the first sum.

8. A system as recited in claim 7 further comprising iteration control means for enabling the generation of said first, second and third sums during N iterations.

9. A system as recited in claim 8 including means for generating partial sums for each of said first, second and third sums during each iteration.

10. A system as recited in claim 9 wherein said combining means generates the first, second and third sums in response to the completion of the N iterations.

11. A system for determining a total seek time required to access a physical disk storage device that stores data in a plurality of logical volumes, said method comprising:

A) collection means for collecting the number of disk accesses to each logical volume during a sample interval, B) weighing means for weighting the number of disk accesses to each logical volume by grouping the data accesses into read miss, disk write and sequential read types of accesses and generating a weighted accesses value according to:

$$WeightedAccesses = N_{rm} + \frac{N_{wr}}{2} + \frac{N_{sr}}{4} \tag{7}$$

where $N_{rm}$, $N_{wr}$ and $N_{sr}$ represent the number of accesses of the read miss, write and sequential read types respectively, C) first summing means for generating a first sum of the weighted accesses to all the logical volumes, D) second summing means for generating a second sum that is the sum of all the first sums, E) third summing means for generating a third sum that is a sum of the squares of all the first sums, and F) combining means for combining the first, second and third sums to obtain the total interval required for all the disk accesses to all the logical volumes in the physical disk storage device.

12. A system as recited in claim 11 wherein the physical disk storage device contains N logical volumes and $A_i$ represents the accesses to a given logical volume, i, including:

i) means in said first summing means for producing the values:

$$A_i = A_1 + A_2 + \ldots + A_i \tag{8}$$

and $$A'_N = A_1 + A_2 + \ldots + A_N \tag{9}$$

ii) means in said second summing means for producing the value:

$$\sum_{i=1}^{N} A_{i'}, \text{ and} \tag{10}$$

iii) means in said third summing means for producing the value:

$$\sum_{i=1}^{N} A_i'^2, \tag{11}$$

iv) means in said combining means for producing a result according to:

$$\sum_{i=1}^{N} A_i' - \frac{\sum_{i=1}^{N} A_i'^2}{A'_N}. \tag{12}$$

13. A system as recited in claim 11 further comprising iteration control means for enabling the generation of said first, second and third sums during N iterations.

* * * * *